United States Patent
Seiber

(10) Patent No.: US 7,058,111 B2
(45) Date of Patent: Jun. 6, 2006

(54) ARRANGEMENTS FOR INCREASING SPUTTER LIFE IN GAS DISCHARGE TUBES

(75) Inventor: Bruce A. Seiber, Arden Hills, MN (US)

(73) Assignee: Honeywell International Inc., Morristown, NJ (US)

( * ) Notice: Subject to any disclaimer, the term of this patent is extended or adjusted under 35 U.S.C. 154(b) by 701 days.

(21) Appl. No.: 09/864,990

(22) Filed: May 24, 2001

(65) Prior Publication Data

US 2002/0176086 A1    Nov. 28, 2002

(51) Int. Cl.
*H01S 3/22* (2006.01)
*H01S 3/03* (2006.01)

(52) U.S. Cl. .......................................... 372/61; 372/55

(58) Field of Classification Search ............ 372/61–62, 372/94, 55–57; 356/350, 459, 472; 357/350; 438/694
See application file for complete search history.

(56) References Cited

U.S. PATENT DOCUMENTS

| | | | | |
|---|---|---|---|---|
| 4,406,965 A | * | 9/1983 | Ljung ........................... | 310/319 |
| 4,481,635 A | * | 11/1984 | Broberg et al. ................ | 372/94 |
| 4,641,970 A | * | 2/1987 | Gustafson et al. .......... | 356/472 |
| 4,667,162 A | * | 5/1987 | Broberg et al. ................ | 372/94 |
| 4,672,624 A | | 6/1987 | Ford | |
| 4,758,839 A | | 7/1988 | Goebel et al. | |
| 4,825,260 A | * | 4/1989 | Hendow et al. ............. | 357/350 |
| 4,993,040 A | * | 2/1991 | Esskuchen et al. ............ | 372/94 |
| 5,074,664 A | * | 12/1991 | Mark et al. .................. | 356/473 |
| 5,088,824 A | * | 2/1992 | Killpatrick et al. .......... | 356/459 |
| 5,098,189 A | * | 3/1992 | vonBieren .................... | 356/459 |
| 5,118,189 A | * | 6/1992 | Sanders et al. .............. | 356/470 |
| 5,150,125 A | | 9/1992 | Hager | |
| 5,220,404 A | | 6/1993 | Martin | |
| 5,271,027 A | * | 12/1993 | Hrovat et al. ............ | 372/38.07 |
| 5,313,488 A | * | 5/1994 | Podgorski ..................... | 372/94 |
| 5,414,727 A | | 5/1995 | Berndt et al. | |
| 5,432,604 A | * | 7/1995 | Canfield et al. ............. | 356/459 |
| 5,628,869 A | * | 5/1997 | Mallon ....................... | 438/694 |
| 5,856,995 A | | 1/1999 | Morris | |
| 6,025,914 A | * | 2/2000 | Ford et al. ................... | 356/350 |
| 6,072,580 A | | 6/2000 | Barnes et al. | |
| 6,211,812 B1 | | 4/2001 | Chiles et al. | |

FOREIGN PATENT DOCUMENTS

GB    2 041 635    9/1980

OTHER PUBLICATIONS

International Search Report, date of mailing Nov. 28, 2002.

* cited by examiner

*Primary Examiner*—Minsun Oh Harvey
*Assistant Examiner*—Phillip Nguyen
(74) *Attorney, Agent, or Firm*—Schiff Hardin LLP

(57) ABSTRACT

A gas discharge tube, such as a ring laser gyroscope, includes a block, a cathode, and an anode. At least a portion of the block is maintained at a reference potential. The cathode may be biased at a higher potential than the reference potential, and the anode may be biased at a higher potential than the cathode. Alternatively, the cathode may be biased at a lower potential than the reference potential, and the anode may be biased at a higher potential than the reference potential. These biases enhance the flow of negative oxygen ions and impede the flow of positive alkali ions to increase sputter life of the gas discharge tube. Additionally or alternatively, a biasing electrode may be applied to the block to overlie the plasma supporting passage between the cathode and the anode. The biasing electrode has a bias to attract positive alkali ions.

22 Claims, 4 Drawing Sheets

ARRANGEMENTS FOR INCREASING SPUTTER LIFE IN GAS DISCHARGE TUBES

TECHNICAL FIELD OF THE INVENTION

The present invention relates to arrangements for extending the sputter life of gas discharge tubes such as ring laser gyroscopes.

BACKGROUND OF THE INVENTION

Ring laser gyroscopes are frequently used to sense angular rates in order to guide and navigate a variety of vehicles such as airplanes, rockets, tanks, ships, submarines, drilling rigs, etc. As shown in FIG. 1, a ring laser gyroscope 10 is typically formed of a block 12 of material such as Zerodur® which has a low coefficient of thermal expansion. Accordingly, the block 12 is resistant to expansion over a wide temperature range. The block 12 is provided with interior passages 14 that communicate with openings at each of its corners. Mirrors 16, 18, and 20 are provided at the corners with one of the mirrors 16, 18, and 20 being used as a read-out device. The interior passages 14 and the mirrors 16, 18, and 20 define a plasma chamber in the form of a closed laser resonant path.

A cathode 22 and anodes 24 and 26 engage corresponding surfaces of the block 12 at openings there through. Indium is usually used to form seals between the block 12 and the electrodes comprising the cathode 22 and the anodes 24 and 26. These seals confine the gas that is energized to provide the laser plasma within the plasma chamber. The energized gas is often referred to as the discharge gas. The Indium seals are compressible so that a tight seal is formed. Also, a dither motor 28 to be discussed below is provided between the block 12 and a support structure.

A source 30 supplies an electric potential across the cathode 22 and the anodes 24 and 26. Typically, the source 30 biases the anodes 24 and 26 at or slightly negative with respect to the potential of the block 12, particularly the potential in the area of the block 12 at the dither motor 28. This potential is a reference potential such as ground. The source 30 biases the cathode 22 at a potential that is more negative than the potential of the anodes 24 and 26.

Accordingly, the electric potential across the cathode 22 and the anode 24 energizes the gas in the interior passages 14 so as to form a laser plasma that supports a laser which traverses the optical closed loop provided by the interior passages 14 in one direction such as a clockwise direction. Similarly, the electric potential across the cathode 22 and the anode 26 energizes the gas in the interior passages 14 so as to form a laser plasma that supports a laser which traverses the optical closed loop provided by the interior passages 14 in the opposite direction such as a counterclockwise direction.

One of the problems associated with the ring laser gyroscope 10 is lock-in which occurs at low rotation rates. Retroscatter from the mirrors 16, 18, and 20 within the optical path formed by the interior passages 14 couples energy from one of the lasers into the counter-propagating laser. When such coupling occurs, the oscillating frequencies of the two counter-propagating lasers lock together in a single frequency. Thus, a ring laser gyroscope can be insensitive to rotations having low rates. Accordingly, the dither motor 28 is provided in order to dither the ring laser gyroscope 10 because dithering mitigates lock-in.

Another of the problems associated with the ring laser gyroscope 10 is ionic current flow. Zerodur® is a lithium-aluminum-silicate glass ceramic material. Glass and glass ceramics are subject to ionic conductivity in which ionic currents are created through the material of the block 12 whenever an electric potential is applied across the block, such as when the cathode 22 and the anodes 24 and 26 are energized. Accordingly, positively charged alkali ions, such as lithium ions, flow as an ionic current toward the cathode 22.

The accumulation of these positively charged ions at the cathode 22 can adversely impact the performance of the ring laser gyroscope 10. For example, the lithium ions can attack the lithium seals between the cathode 22 and the block 12. Various solutions to this problem are offered in U.S. Pat. No. 5,098,189 which discloses the use of a slot and/or secondary negative electrodes to reduce or prevent lithium ion migration, in U.S. Pat. No. 5,856,995 which discloses the use of a trap electrode to attract the lithium ions, and in U.S. Pat. No. 6,025,914 which discloses the use of a dielectric barrier to reduce lithium ion migration.

However, insufficient oxygen that is available to maintain the metal oxide that coats the cathode 22 also can adversely impact the performance of the ring laser gyroscope 10 because the sputter life of the ring laser gyroscope 10 decreases as the available oxygen decreases. Oxygen depletion can result from absorption of the oxygen by positively charged ions on the surfaces of the interior passages 14 of the block 12. Also, positively charged ions at the interior passages 14 prevents the outflow of oxygen from the glass material of the block 12 into the discharge thereby reducing the oxygen available to protect the mirrors 16, 18, and 20 and the cathode 22.

The present invention is directed to arrangements which prevent the absorption and/or outflow of oxygen by positively charged ions such as lithium ions. Accordingly, the present invention increases the sputter life of a ring laser gyroscope.

SUMMARY OF THE INVENTION

In accordance with one aspect of the present invention, a gas discharge tube comprises a block, a cathode, and an anode. At least a portion of the block is maintained at a reference potential. The cathode engages the block and is biased at a higher potential than the reference potential. The anode engages the block and is biased at a higher potential than the cathode.

In accordance with another aspect of the present invention, a gas discharge tube comprises a block, a cathode, and an anode. At least a portion of the block is maintained at a reference potential. The cathode engages the block and is biased at a lower potential than the reference potential. The anode engages the block and is biased at a higher potential than the reference potential.

In accordance with still another aspect of the present invention, a gas discharge tube comprises a cathode, an anode, a block, and a biasing electrode. The block is engaged by the cathode and anode, and the block includes a plasma supporting passage between the cathode and the anode. The biasing electrode overlies the passage and extends substantially between the cathode and the anode. The biasing electrode has a bias to attract positive alkali ions.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
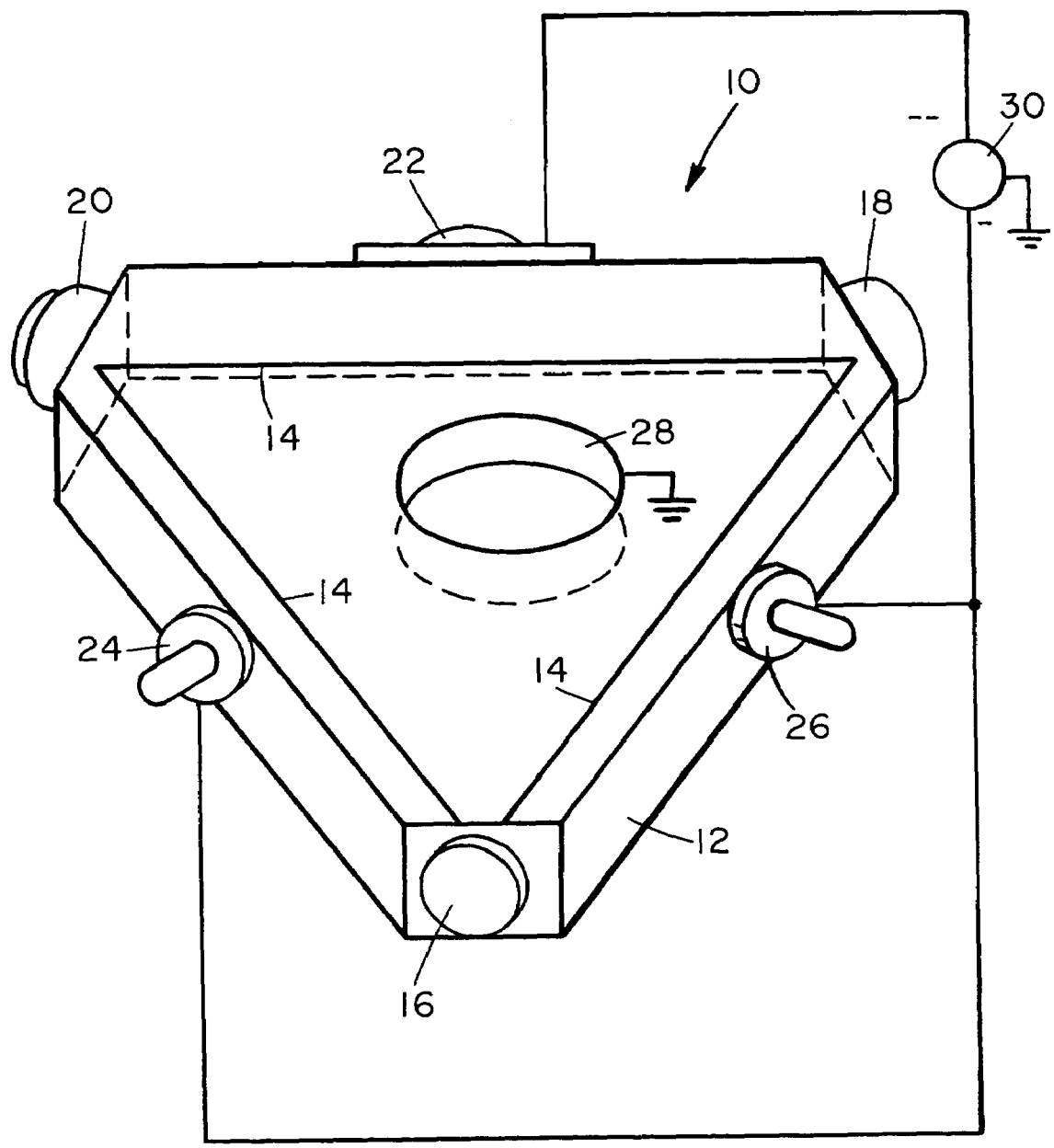
FIG. 1 illustrates a prior art ring laser gyroscope.
Figure 2:
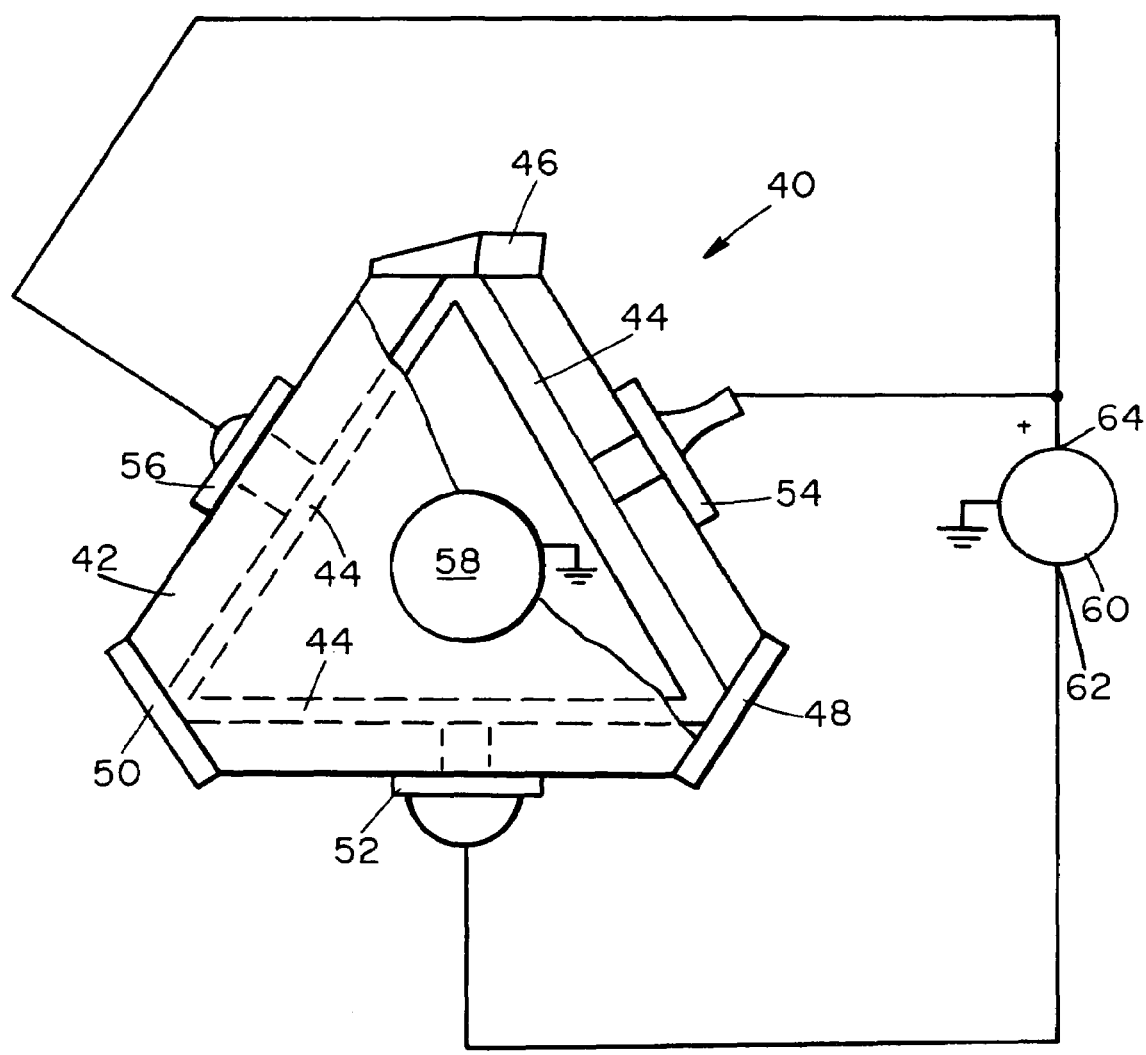
FIG. 2 illustrates a ring laser gyroscope according to a first embodiment of the present invention.

According to the first embodiment of the invention, FIG. 2 illustrates a ring laser gyroscope 40 having a block 42 in which interior passages 44 are formed. Mirrors 46, 48, and 50 are provided at the corners with one of the mirrors 46, 48, and 50 being used as a read-out device as is customary. The interior passages 44 and the mirrors 46, 48, and 50 define a plasma chamber in the form of a closed laser resonant path.

A cathode 52 and anodes 54 and 56 engage corresponding surfaces of the block 42 at openings there through. As is customary, seals are provided between the block 42 and the electrodes comprising the cathode 52 and the anodes 54 and 56 in order to confine the gas that is energized to provide the laser plasma within the plasma chamber. The ring laser gyroscope 40 includes a dither motor 58, and a source 60 supplies an electric potential across the cathode 52 and the anodes 54 and 56. At least a portion of the block 42 in the vicinity of the housing of the dither motor 58 is maintained substantially at the reference (e.g., ground) potential.

The source 60 is arranged to maintain the anodes 54 and 56 positive with respect to the reference (e.g., ground) potential and to maintain the cathode 52 negative with respect to the reference (e.g., ground) potential. For example, the source 60 may be arranged to maintain each of the anodes 54 and 56 at +200 volts and to maintain the cathode 52 at −250 volts.

This biasing of the cathode 52 and the anodes 54 and 56 enhances the flow of negative oxygen ions through the block 42 to the surfaces of the interior passages 44 and impedes the flow of positive ions (such as lithium and other alkali ions) which would react and absorb oxygen in the discharge gas.

Figure 3:
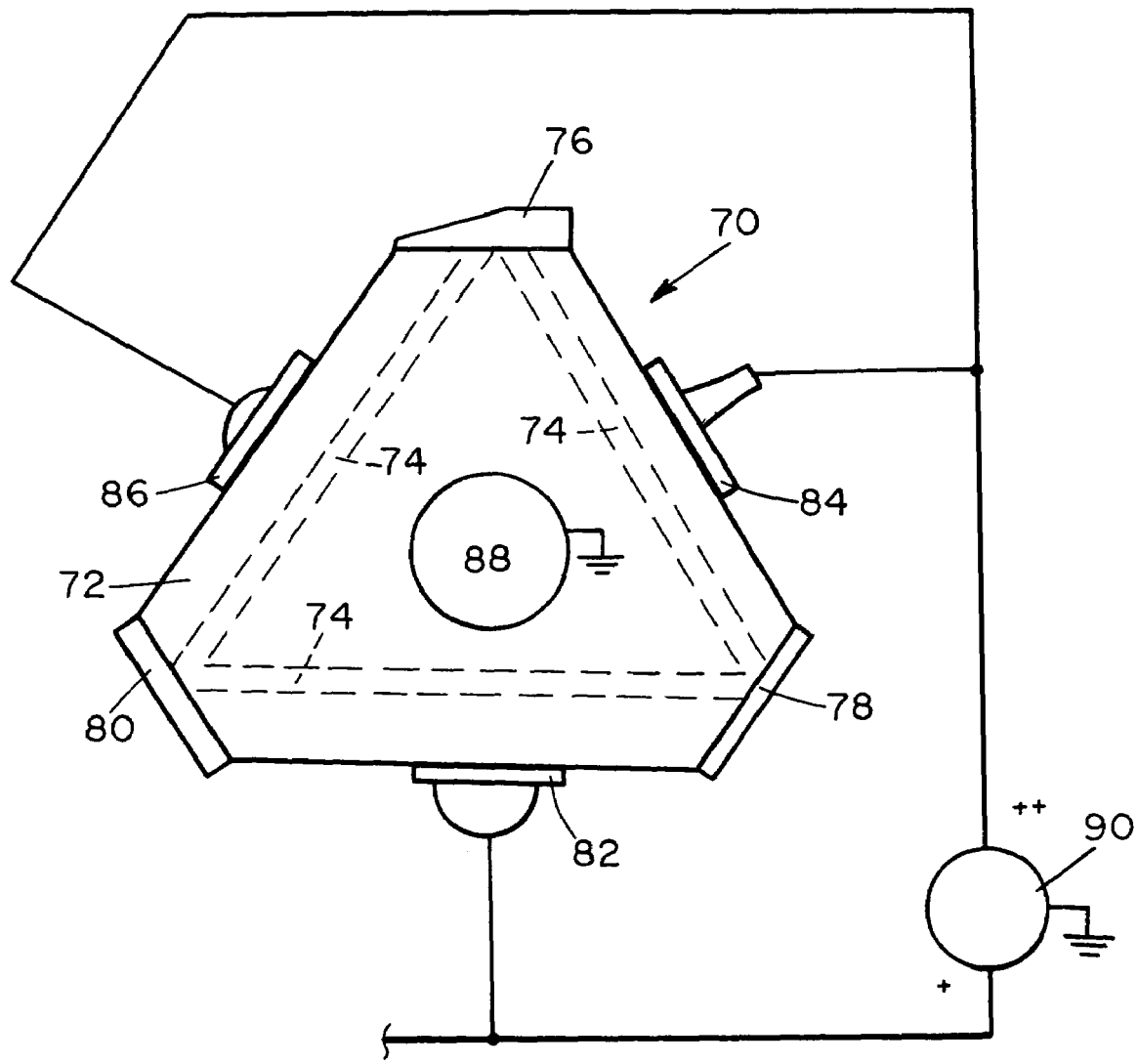
FIG. 3 illustrates a ring laser gyroscope according to a second embodiment of the present invention; and, FIG. 4 illustrates a ring laser gyroscope according to a third embodiment of the present invention.

According to the second embodiment of the invention, FIG. 3 illustrates a ring laser gyroscope 70 having a block 72 in which interior passages 74 are formed. Mirrors 76, 78, and 80 are provided at the corners with one of the mirrors 76, 78, and 80 being used as a read-out device. The interior passages 74 and the mirrors 76, 78, and 80 define a plasma chamber in the form of a closed laser resonant path.

A cathode 82 and anodes 84 and 86 engage corresponding surfaces of the block 72 at openings there through. Seals are provided between the block 72 and the electrodes comprising the cathode 82 and the anodes 84 and 86 in order to confine the gas that is energized to provide the laser plasma within the plasma chamber. The ring laser gyroscope 70 includes a dither motor 88, and a source 90 supplies an electric potential across the cathode 82 and the anodes 84 and 86. At least a portion of the block 72 in the vicinity of the housing of the dither motor 88 is maintained substantially at the reference (e.g., ground) potential.

The source 90 is arranged to maintain the cathode 82 positive with respect to the reference (e.g., ground) potential and to maintain the anodes 84 and 86 even more positive with respect to the reference (e.g., ground) potential. For example, the source 90 may be arranged to maintain each of the anodes 84 and 86 at +440 volts and to maintain the cathode 82 at +10 volts.

This biasing of the cathode 82 and the anodes 84 and 86 also enhances the flow of negative oxygen ions through the block 72 to the surfaces of the interior passages 74 and impedes the flow of positive ions (such as lithium and other alkali ions) which would react and absorb oxygen in the discharge gas.

Figure 4:
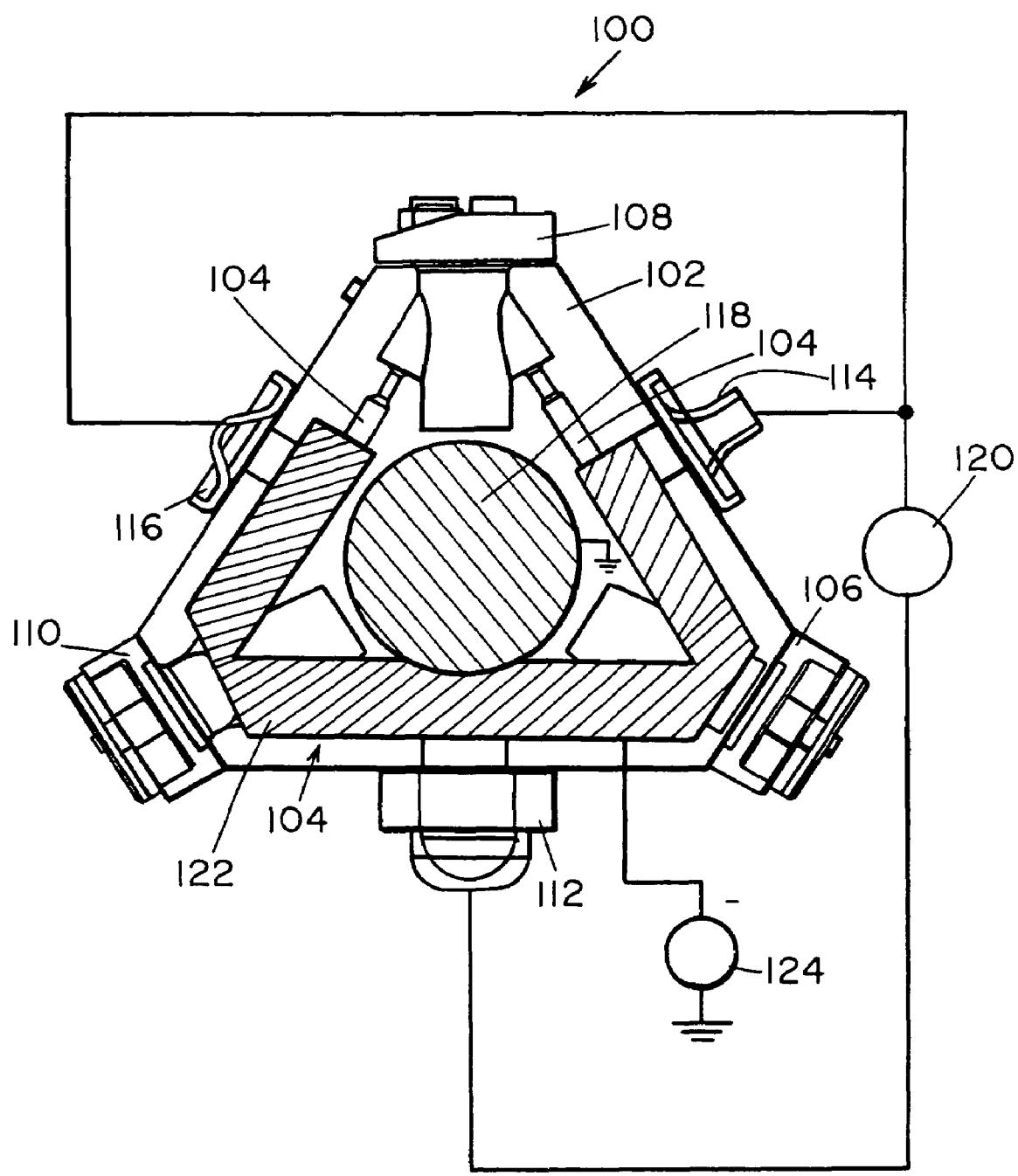

According to the third embodiment of the invention, FIG. 4 illustrates a ring laser gyroscope 100 having a block 102 in which interior passages 104 are formed. Mirrors 106, 108, and 110 are provided at the corners with one of the mirrors 106, 108, and 110 being used as a read-out device. The interior passages 104 and the mirrors 106, 108, and 110 define a plasma chamber in the form of a closed laser resonant path.

A cathode 112 and anodes 114 and 116 engage corresponding surfaces of the block 102 at openings there through. Seals are provided between the block 102 and the electrodes comprising the cathode 112 and the anodes 114 and 116 in order to confine the gas that is energized to provide the laser plasma within the plasma chamber. The ring laser gyroscope 100 includes a dither motor 118, and a source 120 supplies an electric potential across the cathode 112 and the anodes 114 and 116. At least a portion of the block 102 in the vicinity of the housing of the dither motor 118 is maintained substantially at the reference (e.g., ground) potential.

A biasing electrode 122 is provided on one of the faces of the block 102 as shown in FIG. 4 so that it overlies the interior passages 104 between the cathode 112 and the anodes 114 and 116. Alternatively or additionally, a biasing electrode may be provided on the opposite face of the block 102 so that it overlies the interior passages 104 between the cathode 112 and the anodes 114 and 116. The biasing electrode 122 is preferably maintained by a source 124 at a potential that is negative with respect to the reference (e.g., ground) potential. In this way, the biasing electrode 122 enhances the flow of negative oxygen ions through the block 102 to the surfaces of the interior passages 104 and attracts the positive ions (such as lithium and other alkali ions) which would otherwise react and absorb oxygen in the discharge gas. Thus, the positive ions move toward the electrode 122 and away from the interior passages 104 because of the electric field established by the electrode 122.

The source 120 may be arranged to maintain the cathode 112 either positive or negative with respect to the reference (e.g., ground) potential of the block 102 and to maintain the anodes 114 and 116 more positive with respect to the cathode 112. For example, the source 120 may be arranged to maintain the anodes 114 and 116 positive with respect to the reference (e.g., ground) potential and to maintain the cathode 112 negative with respect to the reference (e.g., ground) potential. Alternatively, the source 120 may be arranged to maintain the cathode 112 positive with respect to the reference (e.g., ground) potential and to maintain the anodes 114 and 116 even more positive with respect to the reference (e.g., ground) potential. As a further alternative, the source 120 may be arranged to maintain the cathode 112 and the anodes 114 and 116 negative with the anodes 114 and 116 being less negative than the cathode 112.

Certain modifications of the present invention have been discussed above. Other modifications will occur to those practicing in the art of the present invention. For example, as described above, the biasing electrode 122 is maintained at a negative potential. However, the biasing electrode 122 may be maintained at other potentials such as at the same or different potentials to which the cathode 112 is biased. For example, if the cathode 112 is maintained slightly positive with respect to the reference potential and if the anodes 114 and 116 are maintained much more positive with respect to the reference potential, the electrode 122 can be maintained positive with respect to the reference potential.

Also, the present invention has been described above in connection with a ring laser gyroscope. However, it should be understood that the present invention is useful in connection with other types of gas discharge tubes.

Moreover, the present invention has been described above in connection with a device having a cathode and two anodes. However, it should be understood that the present invention is useful in connection with devices having any combination of cathodes and anodes such as devices having one anode and one cathode and devices having one anode and two cathodes.

Furthermore, as described above, at least a portion of the block 42 in the vicinity of the housing of the dither motor 58 is maintained substantially at the reference (e.g., ground) potential. Typically, this reference potential is provided to the block 42 through the housing of the dither motor 58. However, the reference potential need not be provided through the housing of the dither motor 58. Instead, a post or similar device, which may or may not be provided near the center of the block 42, may be used to provide the reference potential to the block 42. This alternative is particularly useful where a dither motor is not provided.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A gas discharge tube comprising:
    a block, wherein at least a portion of the block is maintained at a reference potential;
    a cathode engaging the block and biased at a higher potential than the reference potential; and,
    an anode engaging the block and biased at a higher potential than the cathode.

2. The gas discharge tube of claim 1 wherein the reference potential is substantially ground.

3. The gas discharge tube of claim 1 further comprising a biasing electrode, wherein the block comprises a plasma supporting passage between the cathode and the anode, wherein the biasing electrode overlies the passage and extends substantially between the cathode and the anode, and wherein the biasing electrode has a bias to attract positive alkali ions.

4. The gas discharge tube of claim 3 wherein the reference potential is substantially ground.

5. The gas discharge tube of claim 3 wherein the biasing electrode is biased above the reference potential.

6. The gas discharge tube of claim 5 wherein the reference potential is substantially ground.

7. The gas discharge tube of claim 3 wherein the anode is a first anode, wherein the gas discharge tube further includes a second anode, wherein the second anode engages the block and is biased at a higher potential than the cathode, wherein the plasma supporting passage extends between the cathode and the first and second anodes, and wherein the biasing electrode overlies the passage and extends substantially between the cathode and the first and second anodes.

8. A gas discharge tube comprising:
    a block, wherein at least a portion of the block is maintained at a reference potential;
    a cathode engaging the block and biased at a lower potential than the reference potential;
    an anode engaging the block and biased at a higher potential than the reference potential, wherein the reference potential is substantially ground; and,
    a biasing electrode, wherein the block comprises a plasma supporting passage between the cathode and the anode, wherein the biasing electrode overlies the passage and extends substantially between the cathode and the anode, and wherein the biasing electrode has a bias to attract positive alkali ions.

9. The gas discharge tube of claim 8 wherein the biasing electrode is biased negatively with respect to the reference potential.

10. The gas discharge tube of claim 8 wherein the anode is a first anode, wherein the gas discharge tube further includes a second anode, wherein the second anode engages the block and is biased at a higher potential than the cathode, wherein the plasma supporting passage extends between the cathode and the first and second anodes, and wherein the biasing electrode overlies the passage and extends substantially between the cathode and the first and second anodes.

11. A gas discharge tube comprising:
    a cathode;
    an anode;
    a block engaged by the cathode and anode, wherein the block comprises a plasma supporting passage between the cathode and the anode;
    a biasing electrode overlying the passage and extending substantially between the cathode and the anode, wherein the biasing electrode has a bias to attract positive alkali ions.

12. The gas discharge tube of claim 11 wherein at least a portion of the block is maintained at a reference potential, wherein the cathode is biased at a higher potential than the block, and wherein the anode is biased at a higher potential than the cathode.

13. The gas discharge tube of claim 12 wherein the reference potential is substantially ground.

14. The gas discharge tube of claim 12 wherein the biasing electrode is biased positively with respect to the reference potential.

15. The gas discharge tube of claim 14 wherein the reference potential is substantially ground.

16. The gas discharge tube of claim 11 wherein at least a portion of the block is maintained at a reference potential, wherein the cathode is biased at a lower potential than the block, and wherein the anode is biased at a higher potential than the block.

17. The gas discharge tube of claim 16 wherein the reference potential is substantially ground.

18. The gas discharge tube of claim 16 wherein the biasing electrode is biased negatively with respect to the reference potential.

19. The gas discharge tube of claim 18 wherein the reference potential is substantially ground.

20. The gas discharge tube of claim 11 wherein at least a portion of the block is maintained at a reference potential, wherein the cathode is biased at a higher potential than the reference potential, and wherein the anode is biased at a higher potential than the cathode.

21. The gas discharge tube of claim 20 wherein the biasing electrode is biased positively with respect to the reference potential.

22. The gas discharge tube of claim 21 wherein the reference potential is substantially ground.

* * * * *